(12) United States Patent
Salus et al.

(10) Patent No.: US 10,663,998 B1
(45) Date of Patent: May 26, 2020

(54) AUTONOMOUS PHASE SHEDDING CONTROL FOR A VOLTAGE REGULATOR

(71) Applicant: Intel Corporation, Santa Clara, CA (US)

(72) Inventors: Tamir Salus, Zikhron Yaakov (IL); Alexander Lyakhov, Portland, OR (US); Alexander Gendler, Kiriat Motzkin (IL); Krishnakanth Sistla, Portland, OR (US); Ankush Varma, Portland, OR (US); Rachid Rayess, Hudson, MA (US); Nimrod Angel, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/370,510

(22) Filed: Mar. 29, 2019

(51) Int. Cl.
| | |
|---|---|
| *H02M 3/157* | (2006.01) |
| *G05F 1/613* | (2006.01) |
| *H02J 1/12* | (2006.01) |
| *H02M 3/158* | (2006.01) |
| *H02M 1/00* | (2006.01) |

(52) U.S. Cl.
CPC .............. *G05F 1/613* (2013.01); *H02J 1/12* (2013.01); *H02M 3/157* (2013.01); *H02M 2001/0032* (2013.01); *H02M 2003/1586* (2013.01)

(58) Field of Classification Search
CPC . H02M 2001/0032; H02M 2003/1586; H02M 3/1584
See application file for complete search history.

(56) References Cited

U.S. PATENT DOCUMENTS

| | | | |
|---|---|---|---|
| 10,128,744 B1* | 11/2018 | Viswanathan | ...... H02M 1/4225 |
| 2003/0090255 A1* | 5/2003 | Bassett | ...... H02J 1/102 323/284 |
| 2007/0013350 A1* | 1/2007 | Tang | ...... H02M 3/1584 323/237 |
| 2008/0246446 A1* | 10/2008 | Djenguerian | ...... H02M 3/157 323/234 |
| 2009/0327786 A1* | 12/2009 | Carroll | ...... G06F 1/26 713/340 |
| 2016/0254745 A1* | 9/2016 | Lim | ...... H02M 3/158 327/540 |
| 2018/0316255 A1* | 11/2018 | Tang | ...... H02M 1/084 |

* cited by examiner

*Primary Examiner* — Harry R Behm
(74) *Attorney, Agent, or Firm* — Schwabe, Williamson & Wyatt, P.C.

(57) ABSTRACT

Various embodiments provide a voltage regulator circuit with automatic phase shedding. A control circuit may control first transitions of a power state of the voltage regulator based on an average current draw of the voltage regulator. The control circuit may further control second transitions of the power state of the voltage regulator based on a voltage droop of the output voltage and/or a peak current draw of the voltage regulator. The first transitions may be performed synchronously, and the second transitions may be performed asynchronously. Other embodiments may be described and claimed.

25 Claims, 5 Drawing Sheets

AUTONOMOUS PHASE SHEDDING CONTROL FOR A VOLTAGE REGULATOR

FIELD

Embodiments of the present invention relate generally to the technical field of electronic circuits, and more particularly to autonomous phase shedding control for a voltage regulator.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Some voltage regulators, such as integrated voltage regulators in an integrated circuit, include multiple power delivery circuits in parallel. The power delivery circuits may be switched between a charge mode, wherein an inductor of the power delivery circuit is coupled to a voltage supply to charge the inductor, and a discharge mode, wherein the inductor is coupled to a load to discharge and provide power to the load. The different power delivery circuits may be switched at different times. Accordingly, individual power delivery circuits may be referred to as a phase of the voltage regulator.

Some voltage regulators allow for phase shedding, in which one or more phases of the voltage regulator are deactivated and the remaining active phases are used to deliver power to the load. However, the number of active phases is determined based on the worst-case current draw for the load.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
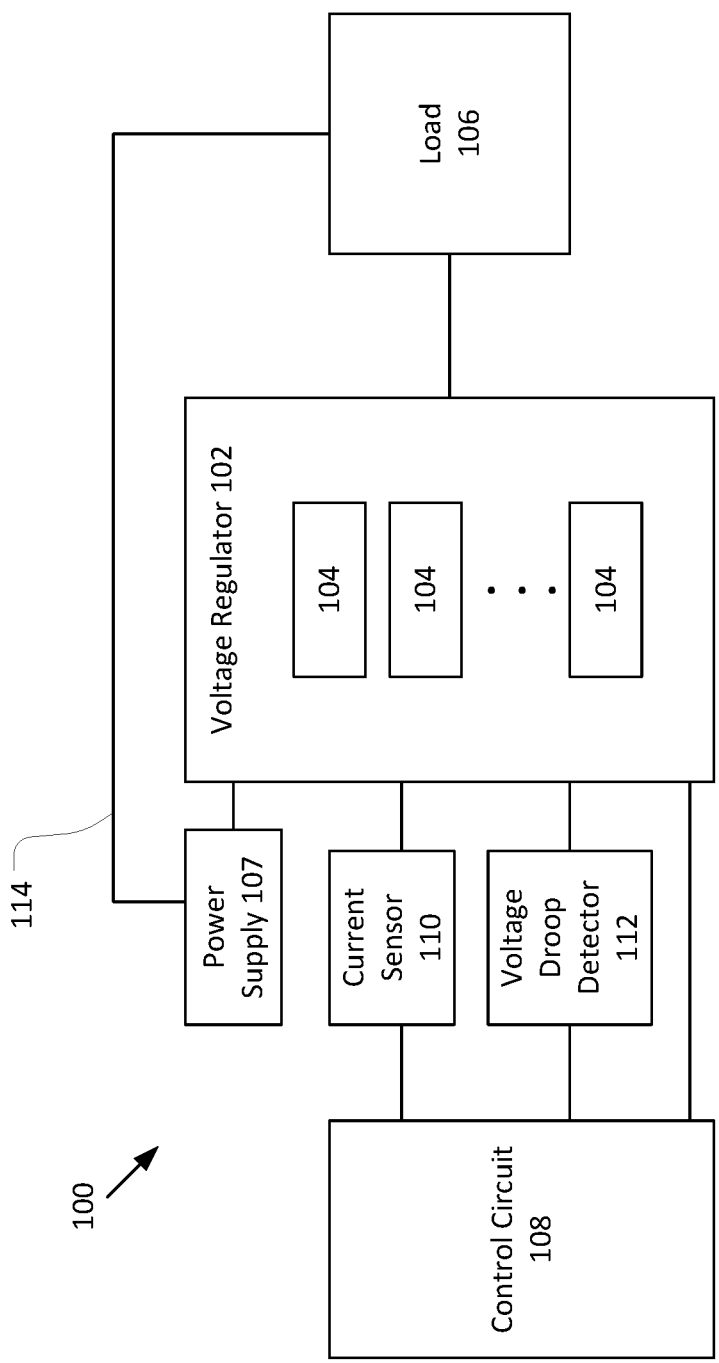
FIG. 1 illustrates a voltage regulator circuit, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments herein provide a voltage regulator circuit with automatic phase shedding. The voltage regulator circuit may include a voltage regulator that includes a plurality of phases. The voltage regulator may be operable in a plurality of power states. The different power states may have different numbers of the phases active and/or other different operating parameters. A control circuit may be coupled to the voltage regulator to perform the automatic phase shedding. For example, the control circuit may control first transitions of a power state of the voltage regulator based on an average current draw of the voltage regulator (e.g., an average current draw per phase of the voltage regulator). The control circuit may further control second transitions of the power state of the voltage regulator based on a voltage droop of the output voltage and/or a peak current draw of the voltage regulator.

In some embodiments, the first transitions may be performed synchronously, while the second transitions may be performed asynchronously. For example, the first transitions may be controlled via a finite state machine (FSM) circuit, while the FSM circuit may be bypassed to control the second transitions. Accordingly, the first transitions may be referred to as slow transitions, while the second transitions may be referred to as fast transitions. Additionally, or alternatively, in some embodiments, the power state of the voltage regulator may be increased or decreased by one power state level for the first transitions, and the power state may be increased directly to the power state with the highest current limit for the second transitions.

In some embodiments, the control circuit may increase a target voltage level of the output voltage if the second transitions are triggered. Additionally, or alternatively, the second transitions may include activation of one or more newly activated phases of the phases, wherein the newly activated phases are asynchronously placed in a discharge mode as part of the second transitions (e.g., by a pulse width modulation (PWM) circuit).

In some embodiments, the voltage regulator circuit may further include a bypass power delivery path coupled to the load (e.g., between a power supply and the load) that bypasses the phases of the voltage regulator. The bypass power delivery path may be activated as part of the second transitions. Other embodiments may not include the bypass power delivery path.

FIG. 1 illustrates a voltage regulator circuit 100 (hereinafter "circuit 100") in accordance with various embodiments. The circuit 100 may include a voltage regulator 102 with multiple phases 104. The phases 104 may be power delivery circuits coupled in parallel with one another. Individual phases 104 may include any suitable components, such as one or more inductors and/or one or more transistors. The voltage regulator 102 may be coupled to a load 106. The voltage regulator 102 may generate a regulated output voltage (e.g., from a supply voltage provided by a power supply 107) and may provide the regulated voltage to the load 106. The load 106 may be a circuit block. In some embodiments, the voltage regulator 102 and the load 106 (and other components of the voltage regulator circuit 100) may be include on the same integrated circuit (IC) die. Such a voltage regulator 102 may be referred to as an integrated voltage regulator, such as a fully integrated voltage regulator. In some embodiments, the IC die may include a plurality of voltage regulator circuits to provide regulated output voltages to different circuit blocks of the IC die.

In various embodiments, a control circuit 108 may be coupled to the voltage regulator 102 to control a power state of the voltage regulator 102. For example, different power states may have a different number of the phases 104 that are active. The activated phases 104 may be switched at different times (e.g., between a charge mode and a discharge mode) to provide the regulated voltage to the load 106. For example, a PWM circuit (e.g., the PWM circuit 210 shown in FIG. 2) may be coupled to the voltage regulator 102 to switch the respective phases 104 between the charge mode and the discharge mode (e.g., using respective PWM signals).

Figure 2:
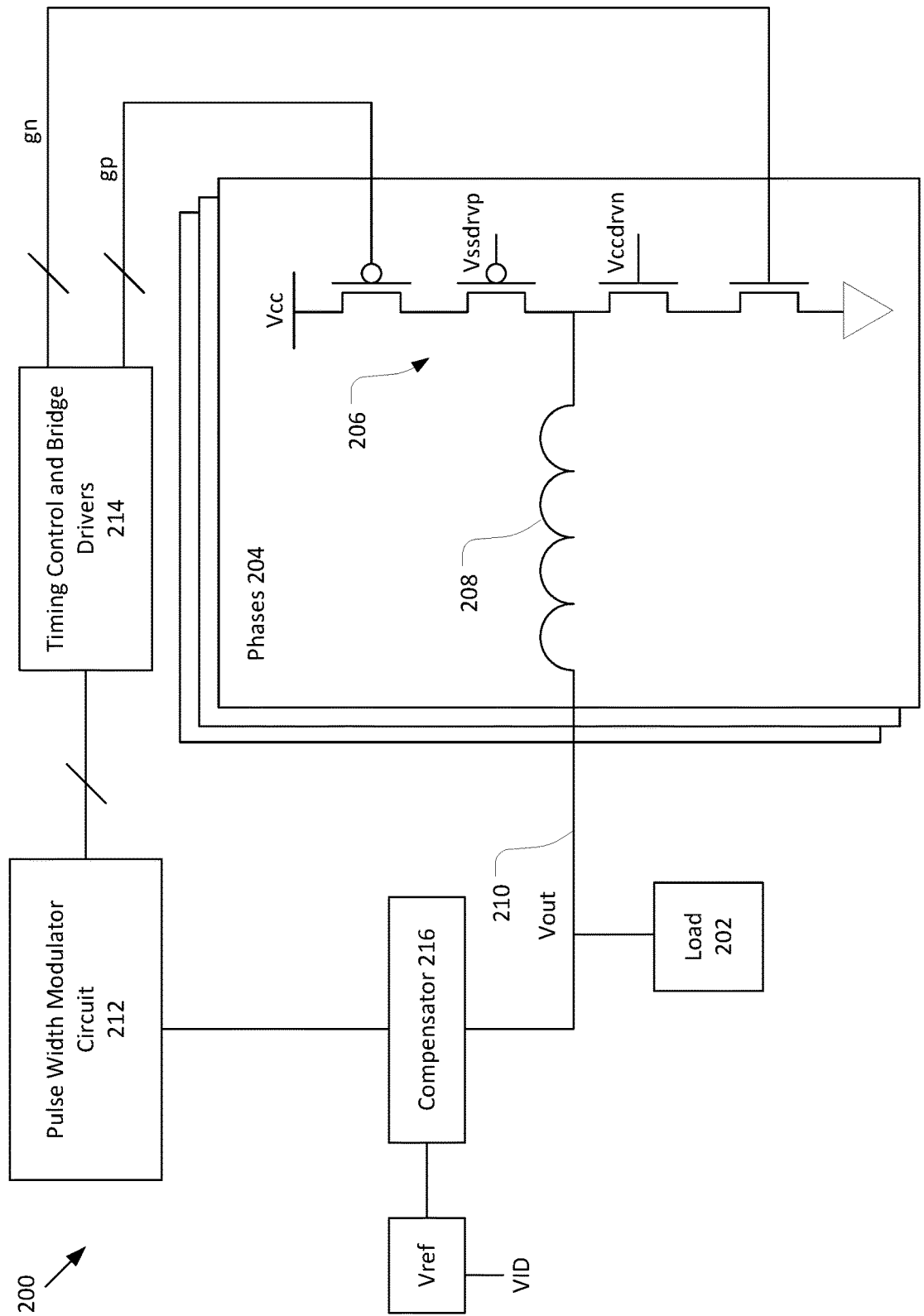
FIG. 2 illustrates a voltage regulator, in accordance with various embodiments.

FIG. 2 illustrates a voltage regulator 200 coupled to a load 202 in accordance with some embodiments. It will be apparent that the voltage regulator 200 shown in FIG. 2 is merely one example of a voltage regulator with which the techniques described herein may be employed. Additionally, some aspects of the voltage regulator 200 may be simplified or omitted in FIG. 2 for ease of understanding.

The voltage regulator 200 includes a plurality of phases 204, with each phase including a cascode driver 206 and an inductor 208. The voltage regulator 200 may be operable in a plurality of power states to generate a regulated output voltage (Vout) at an output terminal 210. Different power states may have a different number of the phases 204 active. A PWM circuit 212 may provide respective PWM signals to the cascode driver 206 of the active phases 204 (e.g., via respective timing control and bridge drivers 214). The PWM signals may switch the active phases 204 between a charge mode, in which the inductor 208 is charged, and a discharge mode, in which the charge from the inductor 208 is discharged to the output terminal 210 to generate the regulated output voltage.

The voltage regulator 200 may further include a compensator circuit 216 to compare the regulated output voltage with a reference voltage (Vref) that corresponds to the target voltage level. The compensator circuit 216 may control the PWM circuit 212 in a feedback loop to provide the regulated output voltage with the target voltage level. The value of the target voltage level may be set by a voltage identifier (VID).

Referring again to FIG. 1, in some embodiments, the circuit 100 may further include a current sensor 110 and/or a voltage droop sensor 112 coupled to the voltage regulator 102 and the control circuit 108. The current sensor 110 may measure a current draw of the load 106 (e.g., at an output of the voltage regulator 102). The voltage droop sensor 112 may measure a voltage level of the regulated voltage and compare it to a target value. The difference between the target value and the measured voltage level may be referred to as the voltage droop.

In various embodiments, the control circuit 108 may determine the power state (e.g., the number of active phases 104) in which the voltage regulator should operate based on the current draw of the load and/or the voltage droop. For example, the control circuit 108 may increase the number of active phases 104 if the current draw (e.g., instantaneous current draw or average current draw over a time period) exceeds a threshold and/or if the voltage droop exceeds a threshold. The control circuit 108 may reduce the number of active phases 104 if the current draw drops below a lower threshold.

In some embodiments, the control circuit 108 may include circuitry to perform fast transitions and slow transitions. For slow transitions, the control circuit 108 may adjust the phase count based on the average current draw (as indicated by the current sensor 110) over a predefined time period. For example, the control circuit 108 may increase the number of active phases 104 if the average current draw exceeds a first threshold, and/or may decrease the number of active phases 104 if the average current draw is below a second threshold (that is less than the first threshold). The control circuit 108 may change the power state iteratively, adjusting the power state up or down by one level when the corresponding trigger is met. The slow transitions may be performed synchronously, via finite state machines.

For fast transitions, the control circuit 108 may increase the phase count if the instantaneous (peak) current is greater than a peak threshold and/or if the voltage droop is greater than a voltage droop threshold (e.g., if the voltage at the output of the voltage regulator 102 drops below a threshold voltage level). The fast transitions may be performed asynchronously (e.g., bypassing the finite state machines) to enable the power state of the voltage regulator 102 to be changed more quickly. Additionally, or alternatively, the fast transitions may skip power states. For example, in some embodiments, when a fast transition is triggered, the control circuit 108 may control the voltage regulator 102 to be in the highest power state, bypassing any intermediate power states.

Accordingly, for a relatively low current draw and/or relatively slow increase of the current draw of the load, the circuit 100 may efficiently operate using slow transitions to have sufficient phases 104 active to provide the required current/voltage to the load, while keeping some phases 104 deactivated to reduce overall power consumption. However, the circuit 100 may trigger fast transitions when needed to provide sufficient current/voltage to the load when the current draw increases rapidly.

In some embodiments, the circuit 100 may further include a bypass power delivery path 114 that may be used to deliver power to the load 106 under some conditions. For example, the control circuit 108 may activate the bypass power delivery path 114 when a fast transition is triggered. The bypass power delivery path 114 may be coupled between the power supply 107 and the load 106 and may bypass the phases 104 of the voltage regulator 102. Other embodiments may not include a bypass power delivery path 114.

Figure 3:
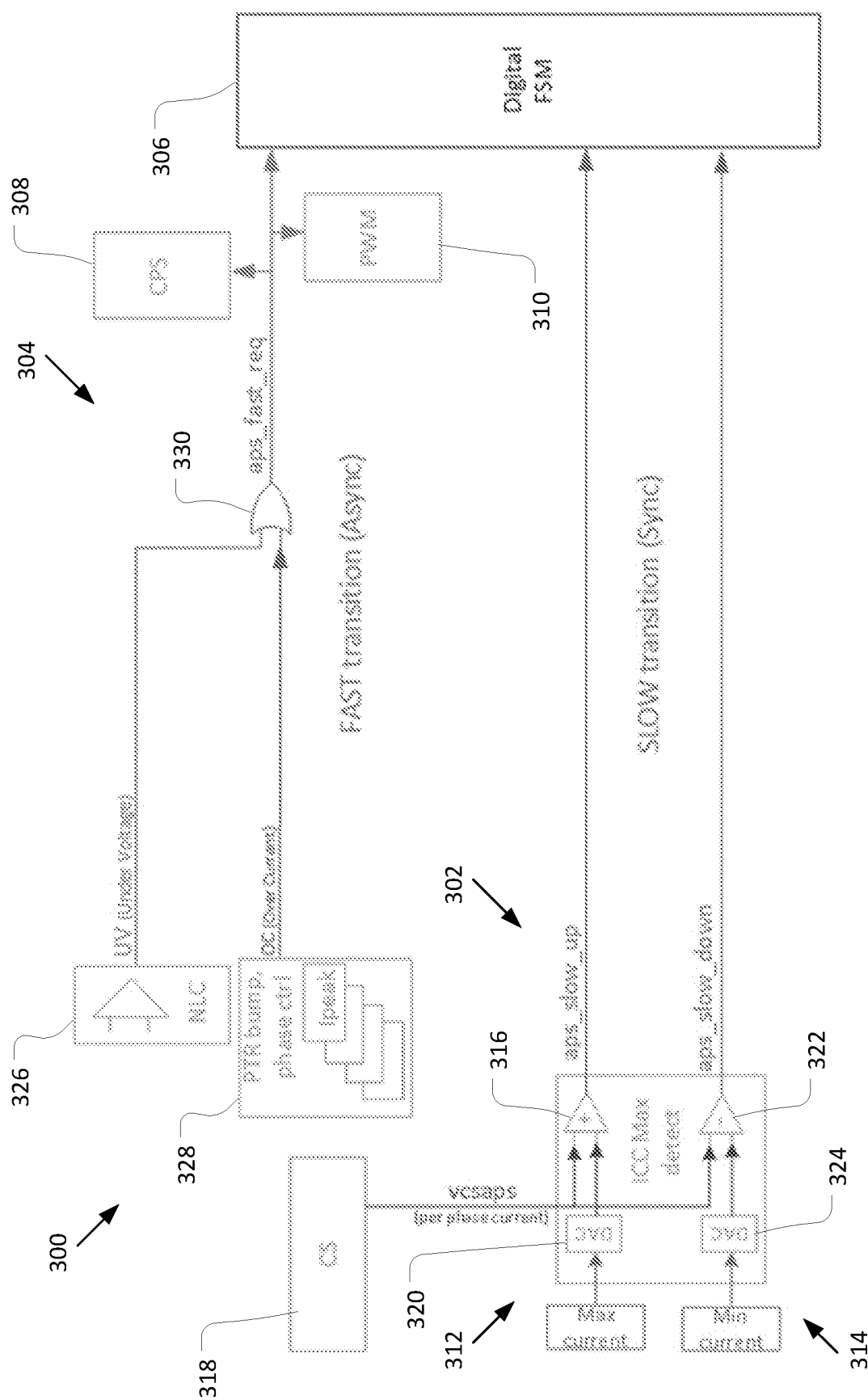
FIG. 3 illustrates a control circuitry for a voltage regulator, in accordance with various embodiments.

FIG. 3 illustrates control circuitry 300 in accordance with various embodiments. Control circuitry 300 may correspond to one or more components of circuit 100, such as control circuit 108. Control circuitry 300 may include slow transition circuitry 302 and fast transition circuitry 304. Slow transition circuitry 302 may make slow transitions in the power state of the voltage regulator synchronously, such as via finite state machine (FSM) circuitry 306. The fast transition circuitry 304 may make fast transitions in the power state of the voltage regulator asynchronously (e.g., bypassing the FSM circuitry 306, such as by directly controlling a power state control circuit 308 and/or a PWM circuit 310).

For example, slow transition circuitry 302 may include first detection circuitry 312 to increase the power state of the voltage regulator (e.g., increase the number of active phases) and/or second detection circuitry 314 to decrease the power state of the voltage regulator (e.g., decrease the number of active phases). The first detection circuitry 312 may include a comparator 316 to compare a current draw of the voltage regulator (e.g., received via a current sensor 318) to a max current threshold (e.g., received via a digital-to-analog converter (DAC) 320 that converts a digital value of the max current threshold into an analog voltage that corresponds to the max current threshold). In some embodiments, the current draw received by the comparator 316 may be an average current draw of the voltage regulator (e.g., per active phase). If the current draw of the voltage regulator exceeds the max current threshold, the comparator 316 outputs a control signal aps_slow_up to the FSM circuitry 306 with a logic value to synchronously increase the power state of the voltage regulator. The FSM circuitry 306 may cause the power state of the voltage regulator to be increased by one level based on the aps_slow_up control signal.

The second detection circuitry 314 may include a comparator 322 to compare the current draw of the voltage regulator (e.g., received via the current sensor 318) to a minimum current threshold (e.g., received via a DAC 324 that converts a digital value of the minimum current threshold into an analog voltage that corresponds to the minimum current threshold). If the current draw of the voltage regulator is less than the minimum current threshold, the comparator 322 outputs a control signal aps_slow_down to the FSM circuitry 306 with a logic value to synchronously decrease the power state of the voltage regulator. The FSM circuitry 306 may cause the power state of the voltage regulator to be decreased by one level based on the aps_slow_down control signal.

The fast transition circuitry 304 may include voltage droop (under voltage) detection circuitry 326 and/or over current detection circuitry 328. Voltage droop detection circuitry 326 may detect when the output voltage of the voltage regulator drops more than a voltage droop threshold below a target voltage level. The voltage droop detection circuitry 326 may generate an output signal to trigger a fast transition in the power state of the voltage regulator based on the detection.

The over current detection circuitry 328 may detect when a peak (instantaneous) current draw of the voltage regulator exceeds a peak current threshold, and may generate an output signal to trigger a fast transition based on the detection. In some embodiments, the over current detection circuitry 328 may separately monitor the current draw of each phase of the voltage regulator, and may trigger a fast transition when the current draw of any one of the phases exceeds a threshold. Alternatively, or additionally, the over current detection circuitry 328 may monitor the current draw per phase of the voltage regulator. For example, the overall current draw of the voltage regulator may be monitored, and the threshold to which the current draw is compared may be based on the power state (e.g., the number of active phases) of the voltage regulator.

The fast transition circuitry 304 may further include logic 330 (e.g., an OR gate) to trigger a fast transition when either the voltage droop detection circuitry 326 or the over current detection circuitry 328 triggers a fast transition. The fast transition signal may be passed to the power state control circuit 308 and/or PWM circuit 310 to take action in accordance with the triggered fast transition. The fast transition signal may be passed to the power state control circuit 308 and/or PWM circuit 310 asynchronously, without passing first through the FSM circuitry 306. The fast transition signal may also be passed to the FSM circuitry 306 to enable the FSM circuitry 306, power state control circuit 308, PWM circuit 310 and/or other components of the voltage regulator circuit to be resynchronized after the fast transition.

As part of the fast transition, the power state control circuit 308 may transition the voltage regulator to the power state with the highest current handling, which may be the power state with all phases activated. In some embodiments, the voltage identifier (VID) that indicates the target value for the regulated output voltage of the voltage regulator may be increased (e.g., to correspond to a higher voltage level) to account for possible voltage droops during phase count transition. The non-linear control (NLC) circuit, if included, may continue to operate as normal. Additionally, or alternatively, in some embodiments, the PWM circuit 310 may set the newly activated phases (e.g., the additional phases that were activated as part of the fast transition to the highest power state) to discharge mode immediately without synchronization with the other phases. For example, the respective PWM signals sent to each newly activated phase may go to the same logic level (e.g., logic high) to place all the phases in discharge mode). The phases that were already active before the fast transition may continue to be switched by the PWM circuit 310. Alternatively, the phases that were already active may additionally be immediately forced to the discharge mode. The PWM circuit 310 may resynchronize the PWM signals thereafter. For example, a sync phase enable signal may go to a first logic level responsive to the fast transition trigger signal, and may thereafter transition to a second logic level to resynchronize the PWM signals of the PWM circuit 310. After resynchronization, the PWM circuit 310 may switch the respective phases of the voltage regulator between the charge mode and the discharge mode at different times in a synchronized manner.

Figure 4:
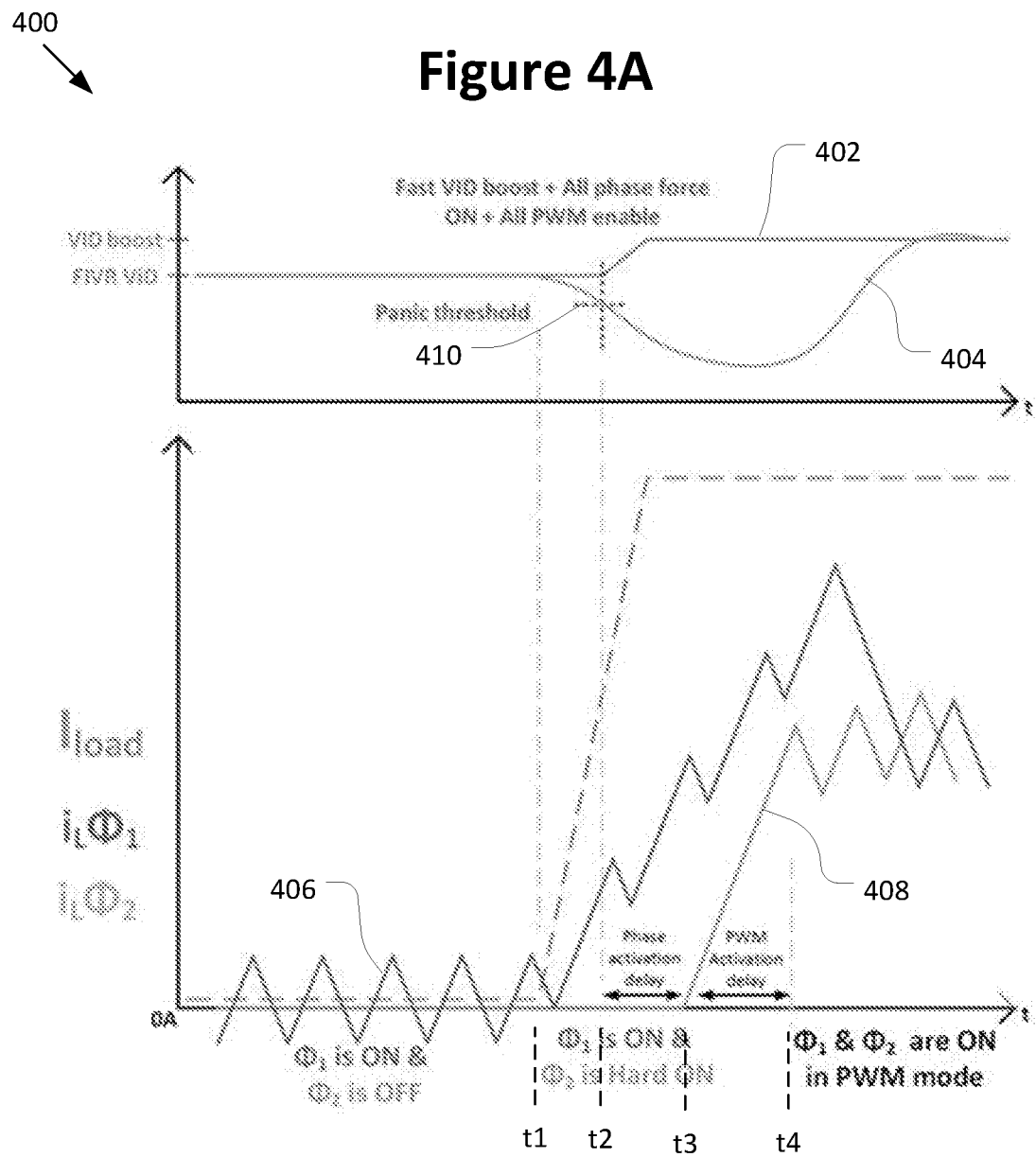
FIGS. 4A and 4B illustrate voltage signals and current signals, respectively, to be employed by a voltage regulator circuit, in accordance with various embodiments.

For example, FIGS. 4A and 4B illustrates various signals 400 associated with the voltage droop detection and triggered fast transition, in accordance with various embodiments. FIG. 4A illustrates the target voltage level 402 and the output voltage level 404 of the voltage regulator over time. FIG. 4B illustrates the load current $I_{load}$, a first phase current $i_L\Phi_1$ (labeled as 406) of a first phase $\Phi_1$ of the voltage regulator, and a second phase current $i_L\Phi_2$ (labeled as 408) of a second phase $\Phi_2$ of the voltage regulator. While only two phases of a voltage regulator are shown in FIG. 4B for ease of understanding, it will be apparent that the voltage regulator may include more than two phases in some embodiments.

Prior to time t1, the load current is relatively low. The first phase is on, and the second phase is off. The first phase is in "PWM mode" to switch between charge mode and discharge mode and provide the regulated voltage to the load and supply the load current. At time t1, the load current increases rapidly. The first phase current rises to attempt to match the load current. However, the regulated voltage 404 drops below the target voltage level 402. At time t2, the regulated voltage 404 drops below the voltage droop threshold 410. Accordingly, a fast transition is triggered.

As part of the fast transition, the second phase is turned on (activated). There may be a delay (e.g., due to the logic of the control circuit) between when the regulated voltage 404 drops below the voltage droop threshold 406 and the time t3 at which the second phase is turned on. The second phase may initially be turned on without PWM control (e.g., without synchronizing with the first phase). Accordingly, the current provided by the second phase may rise quickly so that the first and second phases combine to provide enough current for the load. At time t4, after t3, the first and second phases may be resynchronized. Accordingly, the first and second phases may thereafter operate in PWM mode (e.g., may be switched between the charge mode and discharge mode in a synchronized manner).

In some cases, the load current may increase slowly enough to not cause the output voltage to drop below the voltage droop threshold, but may increase too fast for the slow phase transitions to provide sufficient current. In such a case, a fast transition may be triggered based on the peak current exceeding a peak current threshold (e.g., a current per phase). Once the fast transition is triggered, it may be carried out in a similar manner to that depicted in FIG. 4B and described above.

Figure 5:
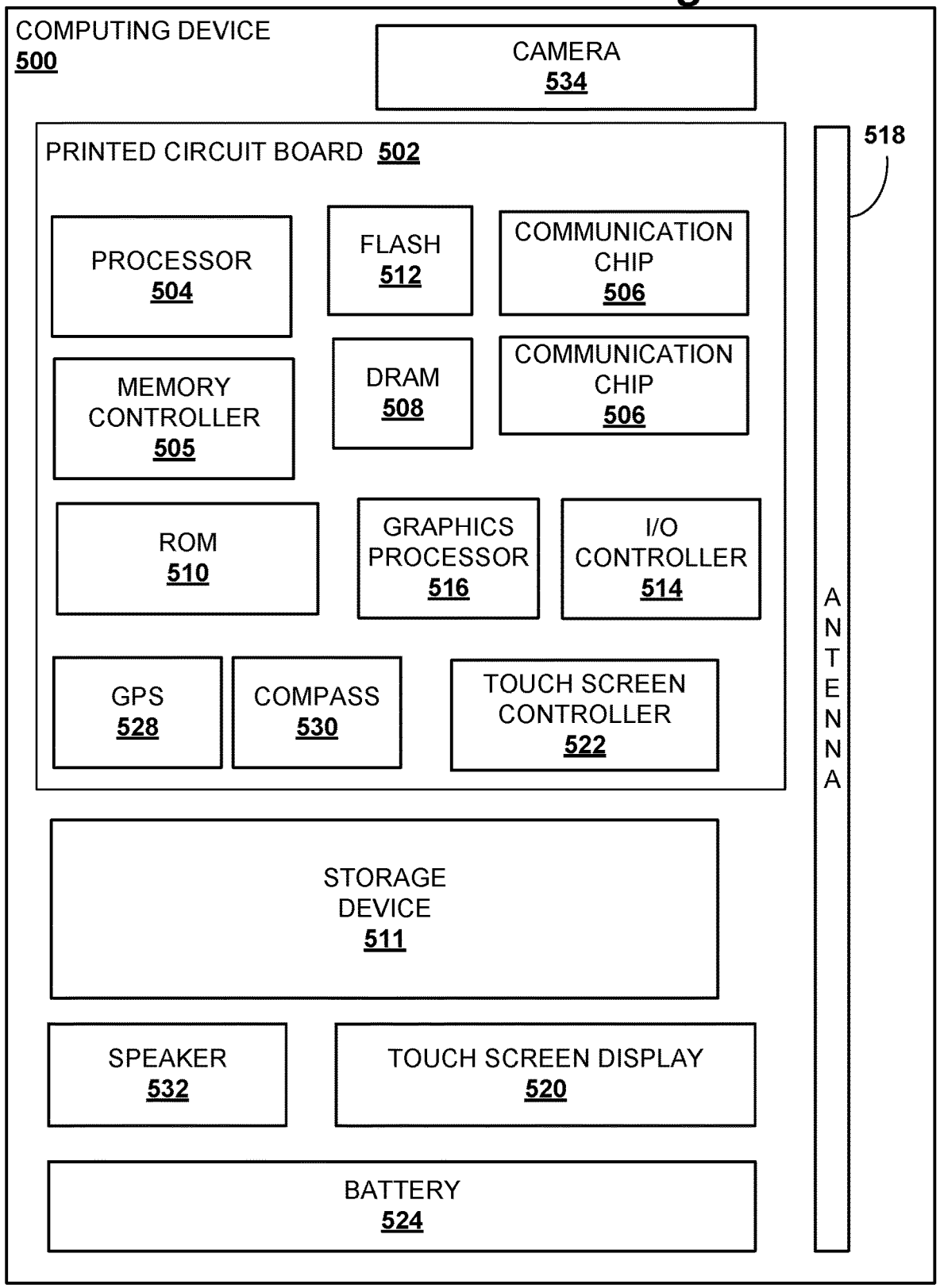
FIG. 5 illustrates an example system configured to employ the apparatuses and methods described herein, in accordance with various embodiments.

FIG. 5 illustrates an example computing device 500 that may employ the apparatuses and/or methods described herein (e.g., circuit 100, voltage regulator 200, control circuit 300, and/or signals 400), in accordance with various embodiments. As shown, computing device 500 may include a number of components, such as one or more processor(s) 504 (one shown) and at least one communication chip 506. In various embodiments, the one or more processor(s) 504 each may include one or more processor cores. In various embodiments, the at least one communication chip 506 may be physically and electrically coupled to the one or more processor(s) 504. In further implementations, the communication chip 506 may be part of the one or more processor(s) 504. In various embodiments, computing device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computing device 500 may include other components that may or may not be physically and electrically coupled to the PCB 502. These other components include, but are not limited to, memory controller 505, volatile memory (e.g., dynamic random access memory (DRAM) 508), non-volatile memory such as read only memory (ROM) 510, flash memory 512, storage device 511 (e.g., a hard-disk drive (HDD)), an I/O controller 514, a digital signal processor (not shown), a crypto processor (not shown), a graphics processor 516, one or more antenna 518, a display (not shown), a touch screen display 520, a touch screen controller 522, a battery 524, an audio codec (not shown), a video codec (not shown), a global positioning system (GPS) device 528, a compass 530, an accelerometer (not shown), a gyroscope (not shown), a speaker 532, a camera 534, and a mass storage device (such as hard disk drive, a solid state drive, compact disk (CD), digital versatile disk (DVD)) (not shown), and so forth. In various embodiments, the processor 504 may be integrated on the same die with other components to form a System on Chip (SoC).

In some embodiments, the one or more processor(s) 504, flash memory 512, and/or storage device 511 may include associated firmware (not shown) storing programming instructions configured to enable computing device 500, in response to execution of the programming instructions by one or more processor(s) 504, to practice all or selected aspects of the methods described herein. In various embodiments, these aspects may additionally or alternatively be implemented using hardware separate from the one or more processor(s) 504, flash memory 512, or storage device 511.

In various embodiments, one or more components of the computing device 500 may include circuit 100, voltage regulator 200, control circuit 300, and/or employ the signals 400 described herein. For example, the processor 504, communication chip 506, I/O controller 514, memory controller 505, and/or another component of computing device 500 may include the circuit 100, voltage regulator 200, control circuit 300, and/or employ the signals 400.

The communication chips 506 may enable wired and/or wireless communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 702.20, Long Term Evolution (LTE), LTE Advanced (LTE-A), 5G, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computing device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computing device 500 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an automobile, a medical device, an appliance, a portable music player, a digital video recorder, an electronic sensor, a smart home device, an internet of things (IoT) device, etc. In further implementations, the computing device 500 may be any other electronic device that processes data.

Some non-limiting Examples of various embodiments are provided below. The various features of the different example embodiments may be variously combined with some features included and others excluded to suit a variety of different applications.

Example 1 is a voltage regulator circuit comprising: a voltage regulator including a plurality of phases, the voltage regulator to provide an output voltage to a load, and the voltage regulator operable in different power states; and a control circuit coupled to the voltage regulator. The control circuit is to: control first transitions of a power state of the voltage regulator based on an average current draw of the voltage regulator; and control second transitions of the power state of the voltage regulator based on a voltage droop of the output voltage or a peak current draw of the voltage regulator.

Example 2 is the voltage regulator circuit of Example 1, wherein the first transitions are performed synchronously and the second transitions are performed asynchronously.

Example 3 is the voltage regulator circuit of Example 2, wherein the first transitions are controlled via a finite state machine (FSM) circuit, and wherein the FSM circuit is bypassed to control the second transitions.

Example 4 is the voltage regulator circuit of Example 1, wherein the first transitions include increases and decreases of the power state, and wherein the second transitions include increases but not decreases of the power state.

Example 5 is the voltage regulator circuit of Example 1, wherein the power state is increased or decreased by one power state level for the first transitions, and wherein the power state is increased directly to the power state with the highest current limit for the second transitions.

Example 6 is the voltage regulator circuit of Example 1, wherein the second transitions include transitions based on the voltage droop of the output voltage and transitions based on the peak current draw of the voltage regulator.

Example 7 is the voltage regulator circuit of Example 1, wherein the average current value is an average current value per active phase of the voltage regulator.

Example 8 is the voltage regulator circuit of Example 1, wherein the control circuit is to increase a target voltage level of the output voltage if the second transition is triggered.

Example 9 is the voltage regulator circuit of Example 1, wherein the second transitions include activation of one or more newly activated phases of the phases, wherein the newly activated phases are asynchronously placed in a discharge mode as part of the second transitions.

Example 10 is the voltage regulator circuit of Example 1, further comprising a bypass power delivery path coupled to the load that bypasses the phases of the voltage regulator, wherein the bypass power delivery path is to be activated as part of the second transitions.

Example 11 is the voltage regulator circuit of Example 1, wherein different numbers of the phases are activated for different power states of the voltage regulator.

Example 12 is the voltage regulator circuit of Example 1, wherein the voltage regulator circuit and the load are on a same integrated circuit die.

Example 13 is a circuit comprising: a load; a voltage regulator including a plurality of phases, the voltage regulator to provide an output voltage to the load; detection circuitry; and voltage droop monitor circuitry. The detection circuitry is to: detect when an average current draw of the voltage regulator falls below a minimum threshold; and trigger a first power state transition of the voltage regulator based on the detection that the average current draw fell below the minimum threshold, wherein the first power state transition is to cause the voltage regulator to have fewer of the phases active. The voltage droop monitor circuitry is to: detect when the output voltage drops below a target voltage by more than a voltage droop threshold; and trigger a second power state transition of the voltage regulator based on the detection that the output voltage dropped below the target voltage by more than the voltage droop threshold, wherein the second power state transition is to cause the voltage regulator to have more of the phases active.

Example 14 is the circuit of Example 13, wherein the detection circuitry is first detection circuitry, and wherein the circuit further comprises second detection circuitry to: detect when the average current draw of the voltage regulator increases above a maximum threshold; and trigger a third power state transition of the voltage regulator based on the detection that the average current draw increased above the maximum threshold, wherein the third power state transition is to cause a power state of the voltage regulator to increase by one level.

Example 15 is the circuit of Example 13, wherein the second power state transition is to cause the voltage regulator to have all the phases active.

Example 16 is the circuit of Example 13, further comprising over current detection circuitry to: detect when an instantaneous current draw of one of the phases is greater than a peak threshold; and trigger a fourth power state transition of the voltage regulator based on the detection that the instantaneous current draw is greater than the peak threshold, wherein the fourth power state transition is to cause the voltage regulator to have more of the phases active.

Example 17 is the circuit of Example 13, further comprising power state control circuitry to perform the first power state transition synchronously and to perform the second power state transition asynchronously.

Example 18 is the circuit of Example 13, further comprising a pulse width modulation (PWM) circuit to provide respective PWM signals to the phases, wherein the PWM circuit is to conductively couple one or more of the phases of the voltage regulator that are activated by the second transition to the load for a time period that is longer than a cycle length of the PWM signals.

Example 19 is the circuit of Example 13, further comprising a bypass power delivery path coupled to the load that bypasses the voltage regulator, wherein the bypass power delivery path is to be activated as part of the second transition.

Example 20 is a computing system comprising: an integrated circuit, the integrated circuit comprising: a circuit block; a voltage regulator to provide a regulated output voltage to the circuit block; a control circuit coupled to the voltage regulator, the control circuit to: trigger first transitions of a power state of the voltage regulator based on an average current draw of the voltage regulator over time, wherein the first transitions are to change the power state up or down by one power state level; and trigger second transitions of the power state of the voltage regulator based on a voltage droop of the output voltage or a peak current draw of the voltage regulator, wherein the second transitions are to change the power state to a max power state that has a highest current capability among available power states of the voltage regulator. The computing system further comprises one or more of a memory circuit, a display, or an antenna coupled to the integrated circuit.

Example 21 is the system of Example 20, wherein the first transitions are performed synchronously and the second transitions are performed asynchronously.

Example 22 is the system of Example 20, wherein the second transitions include transitions based on the voltage droop of the output voltage and transitions based on the peak current draw of the voltage regulator.

Example 23 is the system of Example 20, wherein the control circuit is to increase a target voltage level of the output voltage if the second transition is triggered.

Example 24 is the system of Example 20, wherein the second transitions include activation of one or more newly activated phases of the phases, wherein the newly activated phases are asynchronously placed in a discharge mode for a time period as part of the second transitions, wherein the time period is longer than a pulse width modulation (PWM) cycle of the phases.

Example 25 is the system of Example 20, further comprising a bypass power delivery path coupled to the load that bypasses the voltage regulator, wherein the bypass power delivery path is to be activated responsive to the trigger of the second transitions.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. A voltage regulator circuit comprising:
a voltage regulator including a plurality of phases, the voltage regulator to provide an output voltage to a load, and the voltage regulator operable in different power states; and
a control circuit coupled to the voltage regulator, wherein the control circuit is to:
control first transitions of a power state of the voltage regulator based on an average current draw of the voltage regulator; and
control second transitions of the power state of the voltage regulator based on a voltage droop of the output voltage or a peak current draw of the voltage regulator; and
increase a target voltage level of the output voltage responsive to the second transitions.

2. The voltage regulator circuit of claim 1, wherein the first transitions are performed synchronously and the second transitions are performed asynchronously.

3. The voltage regulator circuit of claim 2, wherein the first transitions are controlled via a finite state machine (FSM) circuit, and wherein the FSM circuit is bypassed to control the second transitions.

4. The voltage regulator circuit of claim 1, wherein the first transitions include increases and decreases of the power state, and wherein the second transitions include increases but not decreases of the power state.

5. The voltage regulator circuit of claim 1, wherein the power state is increased or decreased by one power state level for the first transitions, and wherein the power state is increased directly to the power state with a highest current limit for the second transitions.

6. The voltage regulator circuit of claim 1, wherein the second transitions include transitions based on the voltage droop of the output voltage and transitions based on the peak current draw of the voltage regulator.

7. The voltage regulator circuit of claim 1, wherein the average current draw is an average current value per active phase of the voltage regulator.

8. The voltage regulator circuit of claim 1, wherein the second transitions include activation of one or more newly activated phases of the phases, wherein the newly activated phases are asynchronously placed in a discharge mode as part of the second transitions.

9. The voltage regulator circuit of claim 1, further comprising a bypass power delivery path coupled to the load that bypasses the phases of the voltage regulator, wherein the bypass power delivery path is to be activated as part of the second transitions.

10. The voltage regulator circuit of claim 1, wherein different numbers of the phases are activated for different power states of the voltage regulator.

11. The voltage regulator circuit of claim 1, wherein the voltage regulator circuit and the load are on a same integrated circuit die.

12. A circuit comprising:
a load;
a voltage regulator including a plurality of phases, the voltage regulator to provide an output voltage to the load;
detection circuitry to:
detect when an average current draw of the voltage regulator falls below a minimum threshold; and
trigger a first power state transition of the voltage regulator based on the detection that the average current draw fell below the minimum threshold, wherein the first power state transition is to cause the voltage regulator to have fewer of the phases active;
voltage droop monitor circuitry to:
detect when the output voltage drops below a target voltage by more than a voltage droop threshold; and
trigger a second power state transition of the voltage regulator based on the detection that the output voltage dropped below the target voltage by more than the voltage droop threshold, wherein the second power state transition is to cause the voltage regulator to have more of the phases active; and
a pulse width modulation (PWM) circuit to provide respective PWM signals to the phases, wherein the PWM circuit is to conductively couple one or more of the phases of the voltage regulator that are activated by the second transition to the load for a time period that is longer than a cycle length of the PWM signals.

13. The circuit of claim 12, wherein the detection circuitry is first detection circuitry, and wherein the circuit further comprises second detection circuitry to:
    detect when the average current draw of the voltage regulator increases above a maximum threshold; and
    trigger a third power state transition of the voltage regulator based on the detection that the average current draw increased above the maximum threshold, wherein the third power state transition is to cause a power state of the voltage regulator to increase by one level.

14. The circuit of claim 12, wherein the second power state transition is to cause the voltage regulator to have all the phases active.

15. The circuit of claim 12, further comprising over current detection circuitry to:
    detect when an instantaneous current draw of one of the phases is greater than a peak threshold; and
    trigger a fourth power state transition of the voltage regulator based on the detection that the instantaneous current draw is greater than the peak threshold, wherein the fourth power state transition is to cause the voltage regulator to have more of the phases active.

16. The circuit of claim 12, further comprising power state control circuitry to perform the first power state transition synchronously and to perform the second power state transition asynchronously.

17. The circuit of claim 12, further comprising a bypass power delivery path coupled to the load that bypasses the voltage regulator, wherein the bypass power delivery path is to be activated as part of the second transition.

18. A system comprising:
    an integrated circuit, the integrated circuit comprising:
        a circuit block;
        a voltage regulator to provide a regulated output voltage to the circuit block;
        a control circuit coupled to the voltage regulator, the control circuit to:
            trigger first transitions of a power state of the voltage regulator based on an average current draw of the voltage regulator over time, wherein the first transitions are to change the power state up or down by one power state level; and
            trigger second transitions of the power state of the voltage regulator based on a voltage droop of the output voltage or a peak current draw of the voltage regulator, wherein the second transitions are to change the power state to a max power state that has a highest current capability among available power states of the voltage regulator, wherein the second transitions include activation of one or more newly activated phases of the voltage regulator, wherein the newly activated phases are asynchronously placed in a discharge mode for a time period as part of the second transitions, wherein the time period is longer than a pulse width modulation (PWM) cycle of the phases; and
        one or more of a memory circuit, a display, or an antenna coupled to the integrated circuit.

19. The system of claim 18, wherein the first transitions are performed synchronously and the second transitions are performed asynchronously.

20. The system of claim 18, wherein the second transitions include transitions based on the voltage droop of the output voltage and transitions based on the peak current draw of the voltage regulator.

21. The system of claim 18, wherein the control circuit is to increase a target voltage level of the output voltage if the second transitions are triggered.

22. The system of claim 18, further comprising a bypass power delivery path coupled to the circuit block that bypasses the voltage regulator, wherein the bypass power delivery path is to be activated responsive to the trigger of the second transitions.

23. A system comprising:
    an integrated circuit, the integrated circuit comprising:
        a circuit block;
        a voltage regulator to provide a regulated output voltage to the circuit block;
        a control circuit coupled to the voltage regulator, the control circuit to:
            trigger first transitions of a power state of the voltage regulator based on an average current draw of the voltage regulator over time, wherein the first transitions are to change the power state up or down by one power state level; and
            trigger second transitions of the power state of the voltage regulator based on a voltage droop of the output voltage or a peak current draw of the voltage regulator, wherein the second transitions are to change the power state to a max power state that has a highest current capability among available power states of the voltage regulator;
            increase a target voltage level of the output voltage if the second transitions are triggered; and
        one or more of a memory circuit, a display, or an antenna coupled to the integrated circuit.

24. The system of claim 23, wherein the first transitions are performed synchronously and the second transitions are performed asynchronously.

25. The system of claim 23, wherein the second transitions include transitions based on the voltage droop of the output voltage and transitions based on the peak current draw of the voltage regulator.

* * * * *